CONTROLLED PULSE GENERATOR
Original Filed March 19, 1962
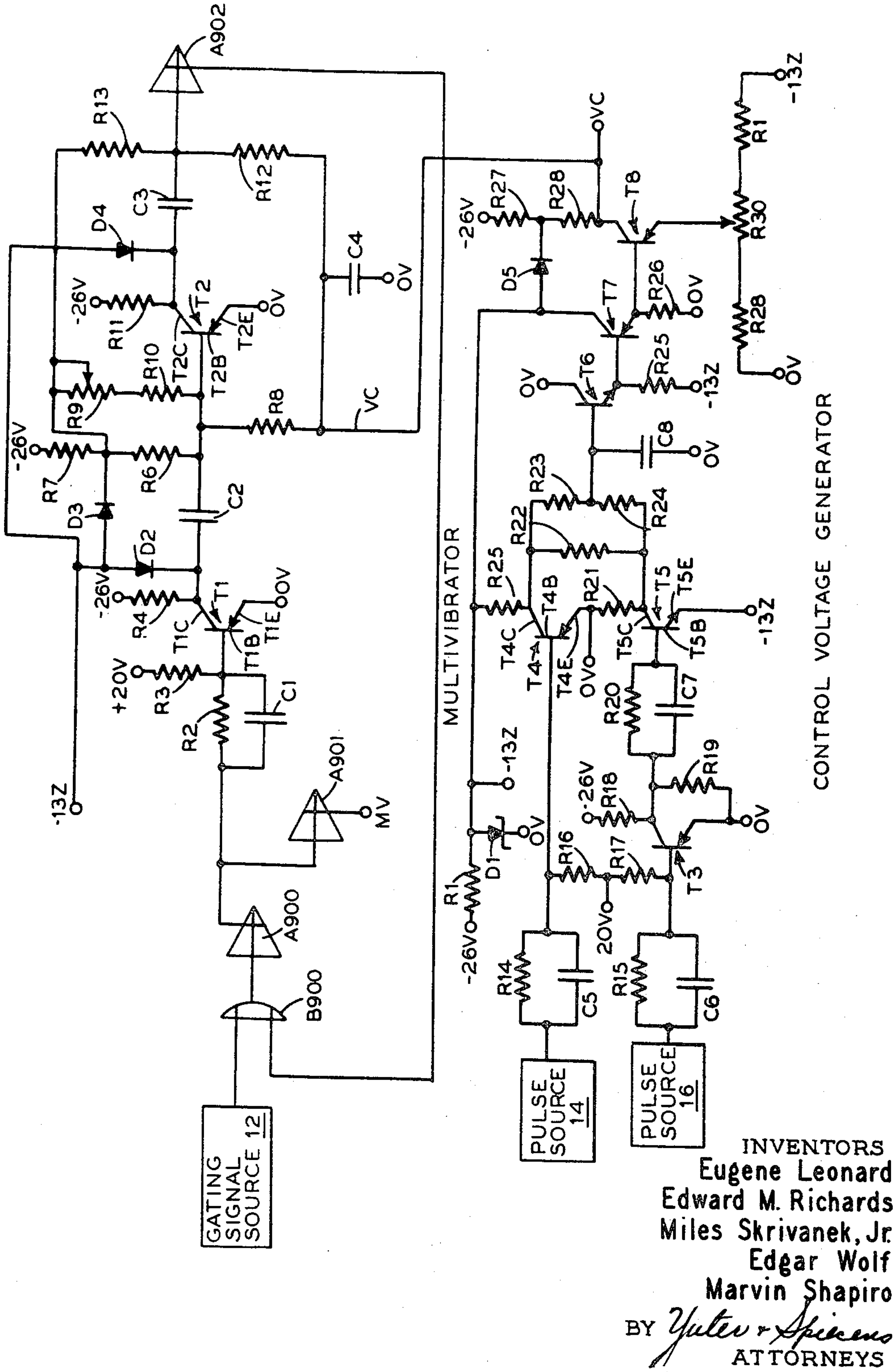
INVENTORS
Eugene Leonard
Edward M. Richards
Miles Skrivanek, Jr.
Edgar Wolf
Marvin Shapiro
BY Yuter & Spickens
ATTORNEYS United States Patent Office 3,409,844

Patented Nov. 5, 1968

3,409,844

CONTROLLED PULSE GENERATOR

Eugene Leonard, Sands Point, Edward M. Richards, East Northport, Edgar Wolf, New Hyde Park, Marvin Shapiro, Huntington, and Miles Skrivanek, Jr., Glenwood Landing, N.Y., assignors to Digitronics Corporation, Albertson, N.Y., a corporation of Delaware Original application Mar. 19, 1962, Ser. No. 180,435, now Patent No. 3,284,774, dated Nov. 8, 1966. Divided and this application Mar. 16, 1966, Ser. No. 539,247

2 Claims. (Cl. 331—113)

ABSTRACT OF THE DISCLOSURE

A controlled pulse generator generates pulses having a controllably variable pulse repetition rate. The pulse generator comprises a gated multivibrator whose timing resistors are returned to a controllably variable voltage source. The multivibrator emits pulses only when a gating signal is present. The repetition rate of the emitted pulses is controlled by the voltage applied to the timing resistors by the variable voltage source.

This invention pertains to a controlled pulse generator and is a division of our copending application Ser. No. 180,435, for Information Transfer System, filed Mar. 19, 1962 which issued as Patent No. 3,284,774 on Nov. 8, 1966.

Pulse generators have many applications. One such application is the generation of strobe pulses. For example, in an information transfer system where the information is transferred between first and second stations remote from each other, it is necessary to insure that the stations operate in synchronism with each other. This necessity is especially critical when the units of information are represented by coded combinations of signals which are of the non-return-to-zero type. In such a type of information transmission, where the units of information are basically combinations of binary digits, the signals only change character whenever the binary digits change value. Therefore, if the unit of information is represented by a plurality of binary digits of one type followed by several binary digits of the second type, it may be impossible to distinguish how many binary digits of the first type are present before the transition occurs. In such a system it is accordingly mandatory to provide apparatus for generating sampling pulses for reliably sampling bits of information represented by signals shifting between two levels at very high rates.

In the above cited application there was provided apparatus for generating pulses for sampling bits of information represented by a signal shifting between two levels and having a transmission rate of $n$ bits per second. The apparatus included first means for generating a pulse for each signal level transition. Pulse generator means were provided for generating a signal alternating between two voltage levels and having a natural frequency substantially equal to $2n$ cycles per second. Third means were responsive to the second means for generating first and second series of pulses having frequencies of $n$ cycles per second. First and second bi-stable means were included which were responsive to the first means and to the first and second series of pulses to generate first and second waveforms having durations related to the time between the received bits of information and the time between successive pulses in the second series of pulses. Means were provided for comparing these first and second signals to generate a control voltage which was fed to the pulse generator means to change the frequency thereof in accordance with the difference in the time duration of the waveforms. The second series of pulses were the sampling pulses for sampling the signals representing the bits of information.

It should be apparent that if the pulse generator does not produce an accurately timed signal the desired quality of the sampling pulses is not obtained.

Furthermore, when using a free running pulse generator it is necessary that the generated signals have a fixed precise phase relative with respect to the received data bits. Therefore, it is necessary to start the generation of the signals precisely with the start of reception of the bits of information.

In addition, it is necessary that the frequency of the signals produced by the pulse generator be easily and precisely changed to follow any changes in the frequency of the information bits.

It is, accordingly, a general object of the invention to provide a controlled generator which satisfies the above cited requirements.

Briefly, the invention contemplates a controlled pulse generator comprising gating means having first and second input terminals and an output terminal whereby a signal is transmitted from the second input terminal to the output terminal only when a control signal is present at the first input terminal. There are first and second amplifiers including first and second transistors. The output terminal of the gating means is connected to the base of the first transistor. A first timing capacitor couples the collector of the first transistor to the base of the second transistor. The collector of the second transistor is connected to one end of a second timing capacitor. Feedback means connect the other end of the second timing capacitor to the first input of the gating means. First and second timing resistors connect the base of the second transistor, and the junction of the second capacitor and the feedback means to a source of potential.

It should be noted that while for the sake of simplicity the controlled pulse generator is being described with respect to a specific information transfer system it is equally useful in other systems. It is, therefore, contemplated that the description is to be construed as exemplary and not limiting and the scope of the invention is to be measured by the appended claims.

Other objects, the features and advantages of the invention will be apparent from the following detailed description when read with the sole drawing figure which shows the now preferred embodiment of a controlled pulse generator in accordance with the invention.

Referring to the sole figure, the controlled and correctable pulse generator 10 in the form of a multivibrator includes the buffer B900 having a first input connected to a gating signal source 12, and a second input. Buffer B900 operates as a gating means in that when its first input terminal is at a negative potential no signals pass from its second input terminal to its output terminal and when its first input terminal is not at a negative potential, signals can pass from its second input terminal to the output terminal. The output of buffer B900 is connected to the input of amplifier A900 whose inverting output terminal is connected to the input of amplifier A901, and to one end of the speed up resistor-capacitor combination C1–R2. The other end of this combination is connected to the base T1B of transistor T1. The base T1B is also coupled via resistor R3 to a plus 20 volt potential. The emitter T1E of transistor T1 is connected to ground potential, and the collector T1C is connected via the resistor R4 to a minus 26 volt potential. Clamping diode D2 connects the collector T1C to a voltage −13Z (a regulated voltage of minus 13 volts). Therefore, the collector T1C can never go below minus 13 volts. Timing capacitor C2 connects the collector T1C to the base T2B of transistor T2. The base T2B is connected via resistor R6 to a point having the same potential as the collector T1C when transistor T1 is not conducting. This potential is equal to −13Z less the drop across diode D2 and is obtained by the diode D3 and the resistor R7 connected to minus 26 volts where resistor R7 has the same resistance as resistor R3 and diodes D2 and D3 are of the same type.

Fine control timing resistors R9 and R10 in series, are connected in parallel with resistor R6. Resistor R8 connects the base T2B to the VC signal line. The emitter T2E of transistor T2 is connected to ground potential and the collector T2C is connected via resistor R11 to a minus 26 volt potential. However, the collector T2C is clamped to a minus 13 volt potential by virtue of the diode D4. Timing capacitor C3 connects the collector T2C to the input of amplifier A902. Timing resistor R13 connects the input of amplifier A902 to the cathode of diode D3 while timing resistor R12 connects the input of amplifier A902 to the VC signal line. The inverting output of amplifier A902 is connected to the second input of buffer B900.

The multivibrator operates in the following manner. Initially, when the signal from gating signal source 12 is at a negative potential, the multivibrator, which is of the free-running type is immobilized. Since the signal is at a negative potential, the output of buffer B900 is also at a negative potential causing the output of amplifier A900 to be at substantially ground potential, by virtue of the divider action of resistors R2 and R3, cutting off transistor T1. Accordingly, a negative potential will exist at the base T2B of transistor T2, which is therefore conducting since its emitter-base junction is forward biased. A negative potential will exist at the input of amplifier A902 which therefore transmits substantially ground potential to the second input of buffer B900, but since the signal at the first input is at a negative potential it overrides the positive potential fed to the second input of buffer B900, and the multivibrator remains in this non-operating state until the signal from gating signal source 12 goes to ground potential.

At that time the output of buffer B900 goes to ground potential, causing the output of amplifier A900 to assume a negative potential. This negative potential is fed via the parallel combination of resistor R2 and capacitor C1 to the base T1B of transistor T1. Transistor T1 starts conducting, causing the transmission via timing capacitor C2 of a positive going transient to the base T2B of transistor T2, which accordingly cuts-off. When transistor T2 cuts-off, a negative going signal is fed to the input of amplifier A902, since the amplifier A902 had been receiving a negative voltage, nothing further happens to its output. Timing capacitor C2 starts discharging via the timing resistors R6, R8, R9 and R10, until finally, the potential of the base T2B drops to a point sufficient to start conduction in transistor T2. As transistor T2 starts conducting, a positive going transient is fed to the input of amplifier A902 which transmits a negative going signal to the input of buffer B900 which passes this negative going signal to the input of amplifier A900. Amplifier A900 transmits a signal of substantially ground potential to the base of transistor T1, causing the transistor T1 to turn off. The process is regenerative until the point is reached where transistor T1 is completely cut-off and transistor T2 is fully conducting. Timing capacitor C3 starts discharging via timing resistors R12 and R13 and the point is reached where the input to amplifier A902 reaches a potential such that a positive going signal is fed from its output via buffer B900 to amplifier A900 which starts generating a negative going signal, causing the transistor T1 to start conducting. The operation is cumulative until the transistor T1 is completely on, and the transistor T2 is cut-off. The relaxation oscillation will continue until the signal from gating signal source 12 is returned to a negative potential.

It should be noted that the output of amplifier A900 is connected to the input of amplifier A901, whose output generates the MV signal which is a square wave by virtue of the described operation. The MV signal is considered to be the output of the multivibrator.

The basic period of the square waves so generated is determined by the capactior C2 operating in conjunction with resistors R6, R8, R9 and R10, and the capacitor C3 operating with resistors R12 and R13. These elements are chosen so that the free running frequency of the multivibrator can be, for example, twelve hundred cycles per second plus or minus less than three percent.

In order to constrain the free running frequency of the multivibrator to the frequency of the data bits received from a transmitter, a control voltage VC is generated. Control voltage VC is fed to the free ends of resistors R8 and R12. It should be noted that the effect of this control voltage is to modify the aiming point toward which the capacitors C2 and C3 discharge. The voltage on the VC signal line is a measure, for example, of the difference in frequency of the square wave generated by the multivibrator and the frequency of the data bits received. The control voltage VC is generated by the remaining elements of the controlled pulse generator.

By way of example, the signal from pulse source 14 is a series of pulses which occur in one to one correspondence with the level transitions of the received data bits (data edges). The width of these pulses will depend on the phase difference between the pulses derived from the MV signal and the data edges. The signal from pulse source 16 is a series of pulses of fixed width occurring in a one to one correspondence with the pulses of source 14. The signal from pulse source 16 is then substracted from the signal from pulse source 14 by the control voltage generating circuitry so that the net result will be a DC shift proportional to the phase error and the rate at which data edges are received, i.e., the rate at which phase comparisons are made.

More particularly, the pulses from pulse source 14 are fed via the speedup network comprising capacitor C5 and resistor R14 to the base T4B of transistor T4. The signal from pulse source 16 is fed via a speedup network comprising capacitor C6 and resistor R15 and via the phase inverter comprising the amplifier T3 and the speedup network comprising capacitor C7 and resistor R20 to the base T5B of transistor T5. Therefore, when the base T4B of transistor T4 receives a square wave, the base T5B of transistor T5 will also receive a square wave which is substantially one hundred and eighty degrees out of phase therewith. If the pulses from both pulse sources are exactly in phase, indicating no error, the pulses received at the bases T4B and T5B, respectively, will be exactly one hundred and eighty degrees out of phase. The collectors T4C and T5C of the transistors T4 and T5 feed opposite arms of an algebraic resistance adder comprising serially connected resistors R23 and R24 having equal values and whose junction is connected to a filtering capacitor C8. The transistors T4 and T5 are substantially linear amplifiers. Therefore, a true subtraction is performed and if there is no phase difference between the signals, no direct-current signal is transmitted from the junction of the resistors R23 and R24. However, if there is a phase difference, either a positive or negative direct-current signal component remains which is a measure of the phase difference. This direct-current signal component is fed via the cascaded emitter follower transistor amplifiers T6 and T7 which are used to provide minimum loading of the junction of resistors R23 and R24 by the input to the common base amplifier T8. Common emitter amplifier T8, accordingly amplifies this direct-current signal component and feeds it as the VC signal to the multivibrator.

It should be noted that the transistor T4 which operates as a common emitter amplifier is of the PNP type whose base T4B receives the input signal and whose collector T4C is coupled via a resistor R25 to the −13Z potential line and whose emitter T4E is connected to ground potential. The transistor T5 is of the NPN type which operates as a common emitter amplifier, whose emitter T5E is connected to a −13Z potential line and whose collector T5C is connected via a resistor R21 to ground potential. The values of the resistors R21 and R25 are substantially equal. Therefore, minimum distortion is introduced in the signals received at the collectors T4C and T5C respectively, which are then subtracted by the algebraic adder.

The potential on the line −13Z is generated at the junction of resistor R1 and diode D1. The free end of resistor R1 is connected to a minus 26 volt potential and the free end of diode D1 is connected to ground. The diode D1 is a Zener diode and at this time is in the breakdown condition, establishing a minus thirteen volt potential which is regulated. The initial or quiescent setting of the value for the control voltage VC is obtained by fixing the potential of the emitter T8E of the transistor amplifier T8. The emitter T8E is connected to the center tap of a potentiometer comprising resistors R28, R30 and R31, whose outer arms are connected to ground potential and the −13Z potential line respectively.

There will now be obvious to those skilled in the art many modifications and variations satisfying many or all of the objects but which do not depart from the spirit of the invention. For example, although the frequency control voltage was derived from the phase comparison of pulses in specific pulse trains, the frequency control voltage could be generated by the comparison of any related pulse trains or even from an analog voltage generator.

What is claimed is:

1. A controlled pulse generator comprising: gating means including first and second input terminals and an output terminal whereby a signal is transmitted from said second input terminal to said output terminal only when a gating signal is present at said first input terminal; a first amplifier including a first transistor having an emitter, a collector and a base, means for applying an operating potential to said base, means for applying an operating potential to said collector, means for applying an operating potential to said emitter; means for coupling the output terminal of said gating means to the base of said first transistor; a second amplifier including a second transistor having an emitter, a collector and a base, means for applying an operating potential to said base, means for applying an operating potential to said emitter, means for applying an operating potential to said collector; a first timing capacitor for coupling the collector of said first transistor to the base of said second transistor; a first timing resistor having one end coupled to the base of said second transistor; a second timing capacitor having one end coupled to the collector of said second transistor; a second timing resistor having one end connected to the other end of said second timing capacitor; feedback means for coupling the junction of said second timing capacitor and said second timing resistor to the second input terminal of said gating means; means for applying a varying potential to the other ends of said first and second timing resistors for varying the frequency of the generated pulses said potential varying means comprising a third transistor including a base, an emitter and a collector; means for applying an operating potential to said base, means for applying an operating potential to said collector, means for applying an operating potential to said emitter; means connected to the base of said third transistor for receiving a first signal to be compared; a fourth transistor including an emitter, a base and a collector, means for applying an operating potential to said base, means for applying an operating potential to said emitter, and means for applying an operating potential to said collector; means connected to the base of said fourth transistor for receiving a second signal to be compared; first and second adding resistors serially connecting the collectors of said third and fourth transistors; and means for connecting the junction of said first and second adding resistors to the other ends of said first and second timing resistors.

2. The pulse generator of claim 1 including filtering means coupled to the junction of said first and second adding resistors.

References Cited

UNITED STATES PATENTS 2,935,698 5/1960 Adams ---------------- 331—113
3,178,658 4/1965 Henrion ------------ 331—113 X ROY LAKE, *Primary Examiner.*

S. H. GRIMM, *Assistant Examiner.*